(12) United States Patent
Dewitt et al.

(10) Patent No.: US 11,012,235 B2
(45) Date of Patent: May 18, 2021

(54) SECURING DATA BASED ON RANDOMIZATION

(71) Applicant: MX Technologies, Inc., Lehi, UT (US)

(72) Inventors: Brandon Dewitt, Provo, UT (US); Ryan McBride, Lehi, UT (US); Josh Bodily, Lehi, UT (US)

(73) Assignee: MX TECHNOLOGIES. INC., Lehi, UT (US)

( * ) Notice: Subject to any disclaimer, the term of this patent is extended or adjusted under 35 U.S.C. 154(b) by 324 days.

(21) Appl. No.: 16/128,378

(22) Filed: Sep. 11, 2018

(65) Prior Publication Data

US 2019/0081782 A1   Mar. 14, 2019

Related U.S. Application Data

(60) Provisional application No. 62/556,556, filed on Sep. 11, 2017.

(51) Int. Cl.
| | |
|---|---|
| *G06F 21/00* | (2013.01) |
| *H04L 9/08* | (2006.01) |
| *G06F 21/60* | (2013.01) |
| *G06F 21/62* | (2013.01) |
| *G06F 21/78* | (2013.01) |

(52) U.S. Cl.
CPC .......... *H04L 9/0869* (2013.01); *G06F 21/602* (2013.01); *G06F 21/6218* (2013.01); *G06F 21/78* (2013.01)

(58) Field of Classification Search
CPC ........ G06F 21/60; G06F 21/604; G06F 21/62; G06F 21/6209; G06F 21/6218; G06F 21/78; G06F 21/79; G06F 21/80; G06F 21/805
See application file for complete search history.

(56) References Cited

U.S. PATENT DOCUMENTS

2016/0342608 A1\*  11/2016  Burshteyn ............... H04L 63/06

\* cited by examiner

*Primary Examiner* — Edward Zee
(74) *Attorney, Agent, or Firm* — Kunzler Bean & Adamson, PC

(57) ABSTRACT

Apparatuses, methods, systems, and program products are presented for securing data based on randomization. An apparatus includes a partition module that is configured to partition a data element into a plurality of data segments. An apparatus includes a storage module configured to randomly determine a first set of storage locations for a plurality of data segments such that the data segments are not stored in contiguous storage locations. An apparatus includes a threshold module configured to randomly determine an access threshold for a data element. An access threshold, in certain embodiments, comprises a number of times a data element can be accessed before determining different storage locations for a plurality of data segments, which may be reconstituted in response to a data access. A storage module randomly determines a second set of storage locations for a plurality of data segments in response to an access threshold being satisfied.

20 Claims, 5 Drawing Sheets

SECURING DATA BASED ON RANDOMIZATION

CROSS-REFERENCES TO OTHER APPLICATIONS

This application claims the benefit of U.S. Provisional Patent Application No. 62/556,556 entitled "ACTIVE SECRET" and filed on Sep. 11, 2017, for Brandon Dewitt et al., which is incorporated herein by reference.

FIELD

This invention relates to secure digital secrets and more particularly relates to the secure handling and storage of digital secrets.

BACKGROUND

Security and encryption often rely on keys, credentials, or other information. While the security often hinges on this information remaining secure, it may be shared with or accessible to certain users, stored unencrypted in memory, or the like, compromising security.

SUMMARY

Apparatuses are presented for securing data based on randomization. An apparatus, in one embodiment, includes a partition module that is configured to partition a data element into a plurality of data segments. In certain embodiments, an apparatus includes a storage module configured to randomly determine a first set of storage locations for a plurality of data segments such that the data segments are not stored in contiguous storage locations. In some embodiments, an apparatus includes a threshold module configured to randomly determine an access threshold for a data element. An access threshold, in certain embodiments, comprises a number of times a data element can be accessed before determining different storage locations for a plurality of data segments, which may be reconstituted in response to a data access. In further embodiments, a storage module randomly determines a second set of storage locations for a plurality of data segments in response to an access threshold being satisfied.

Methods are presented for securing data based on randomization. A method, in one embodiment, includes partitioning a data element into a plurality of data segments. In certain embodiments, a method includes randomly determining a first set of storage locations for a plurality of data segments such that the data segments are not stored in contiguous storage locations. In some embodiments, a method includes randomly determining an access threshold for a data element. An access threshold, in certain embodiments, comprises a number of times a data element can be accessed before determining different storage locations for a plurality of data segments, which may be reconstituted in response to a data access. In further embodiments, a method includes determining a second set of storage locations for a plurality of data segments in response to an access threshold being satisfied.

An apparatus, in further embodiments, includes means for partitioning a data element into a plurality of data segments. In certain embodiments, an apparatus includes means for randomly determining a first set of storage locations for a plurality of data segments such that the data segments are not stored in contiguous storage locations. In some embodiments, an apparatus includes means for randomly determining an access threshold for a data element. An access threshold, in certain embodiments, comprises a number of times a data element can be accessed before determining different storage locations for a plurality of data segments, which may be reconstituted in response to a data access. In further embodiments, an apparatus includes means for randomly determining a second set of storage locations for a plurality of data segments in response to an access threshold being satisfied.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
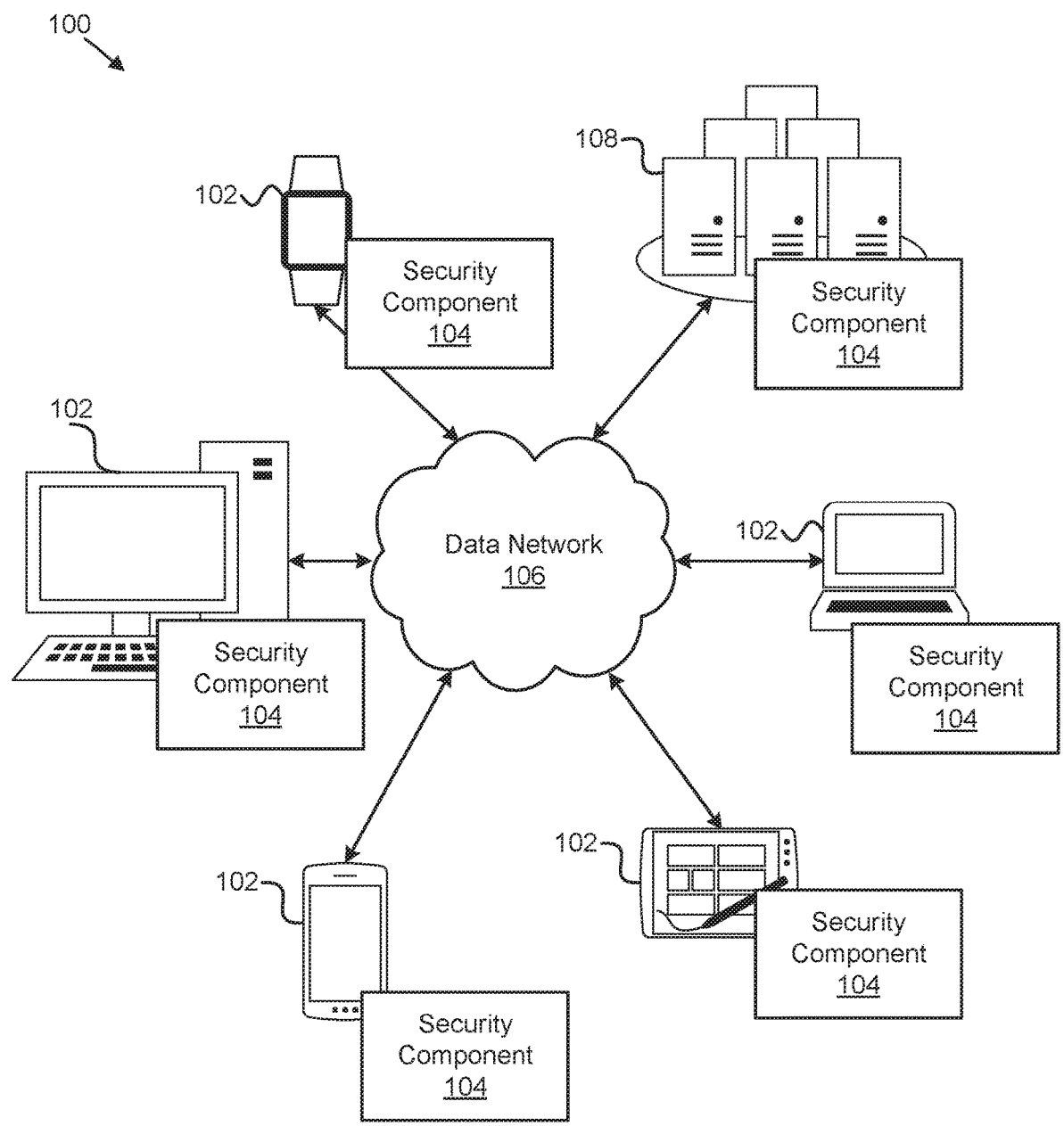
FIG. 1 depicts a schematic block diagram of one embodiment of a system for securing data based on randomization.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules (or engines), in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for securing data based on randomization. In one embodiment, the system 100 includes one or more computing devices 102, one or more security components 104, one or more data networks 106, and one or more servers 108. In certain embodiments, even though a specific number of computing devices 102, security components 104, data networks 106, and servers 108 are depicted in FIG. 1, one of skill in the art will recognize, in light of this disclosure, that any number of computing devices 102, security components 104, data networks 106, and servers 108 may be included in the system 100.

In one embodiment, the system 100 includes one or more computing devices 102. The computing devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the computing devices 102 are communicatively coupled to one or more other computing devices 102 and/or to one or more servers 108 over a data network 106, described below. The computing devices 102, in a further embodiment, are configured to execute various programs, program code, applications, instructions, functions, or the like, which may access, store, download, upload, or the like data located on one or more servers 108. The computing devices 102 may include instructions for encrypting data, decrypting data, generating encryption keys, sending data, receiving data, or the like.

In one embodiment, the security component 104 is configured to actively, dynamically, and randomly secure a data element, such as a secret key, sensitive data, or the like, in memory of a computing device 102 (e.g., in volatile memory, in non-volatile memory, or the like). A data element, in various embodiments, may comprise a string, plain text, obfuscated text (e.g., encrypted text, shuffled or scrambled text, or the like), images, documents, videos, encryption keys, bytes, bits, data buffers, and/or an object of another data type.

The security component 104, in certain embodiments, splits, partitions, divides, or the like, a data element into multiple data segments that can be stored at multiple different zones of memory (e.g., volatile memory, non-volatile memory, files, buffers, or the like) in one or more of a random order, a random chunk size, or the like, and may randomly move the data segments (e.g., to different zones of memory, to a different order, to different files, or the like) during runtime (e.g., while a mobile application executes on a mobile computing device 102, during runtime of a desktop application on a personal computing device 102, or the like). In this manner, in some embodiments, a programmer, developer, builder, implementer, owner, tester, administrator, hacker, and/or another user may not know or be able to determine the data element at any given time, even if the user inspects the memory storing the pieces of the data element because the data element is partitioned into data segments, and the data segments are stored at multiple different, non-contiguous, and randomly determined locations in memory.

The security component 104, in certain embodiments, may securely track or be configured to securely determine locations where the data segments are stored in order to reassemble and/or use the data element. For example, one or more of a random order, a random size, a random location, or the like for pieces of a secret may be based on a reproducible seeded pseudorandom function or algorithm that may be securely reversible by the security component 104, that may have a predetermined seed (e.g., known only to the security component 104, or the like), which the security component 104 may use to locate and/or reassemble pieces of the secret.

In certain embodiments, the security component 104 may provide multiple levels and/or tiers of random orders, random sizes, random locations, or the like (e.g., one randomizing one or more of an order, size, and/or location for a secret; randomizing one or more of an order, size, and/or location of a seed for randomizing the secret; randomizing one or more of an order, size, and/or location of a seed for randomizing another seed; and/or one or more other levels or tiers of randomization). "Random" and/or "randomization," as used herein, may include random, pseudorandom, semirandom, partially random, and other randomization functions.

In this manner, the security component 104, in certain embodiments, may continuously, dynamically, and/or randomly shuffle, scramble, change sizes, move locations, or otherwise adjust storage of a data element in memory, to increase the security and/or integrity of the data element by making it difficult or impossible for a bad actor or other user to determine, misappropriate, or otherwise steal the data element. The security component 104, including one or more sub-modules, may be located on one or more computing devices 102 in the system 100, one or more servers 108, one or more network devices, one or more security systems, or the like. Other embodiments of a security component 104 are described in more detail below with reference to FIGS. 2 and 3.

In various embodiments, the security component 104 may be embodied as a hardware appliance that can be installed or deployed on a computing device 102, on a server 108, or elsewhere on the data network 106. In certain embodiments, the security component 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); or the like. A hardware appliance of the security component 104 may include a power interface, a wired and/or wireless network interface, a graphical interface that attaches to a display, and/or a semiconductor integrated circuit device as described below, configured to perform the functions described herein with regard to the security component 104.

The security component 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like.

In one embodiment, the security component 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security component 104.

The semiconductor integrated circuit device or other hardware appliance of the security component 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the security component 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like. The system 100 may include a plurality of data networks 106.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, or the like. The one or more servers 108 may be configured as a mail server, a web server, an application server, an FTP server, a media server, a data server, a web server, a file server, a virtual server, or the like. The one or more servers 108 may be communicatively coupled (e.g., networked) over a data network 106 to one or more computing devices 102. The one or more servers 108 may store data associated with a computing device 102, with a user, or the like. A server 108 may store sensitive data, such as login credentials, financial information, and/or other personal identifying information. The sensitive data may be stored in one or more databases.

Figure 2:
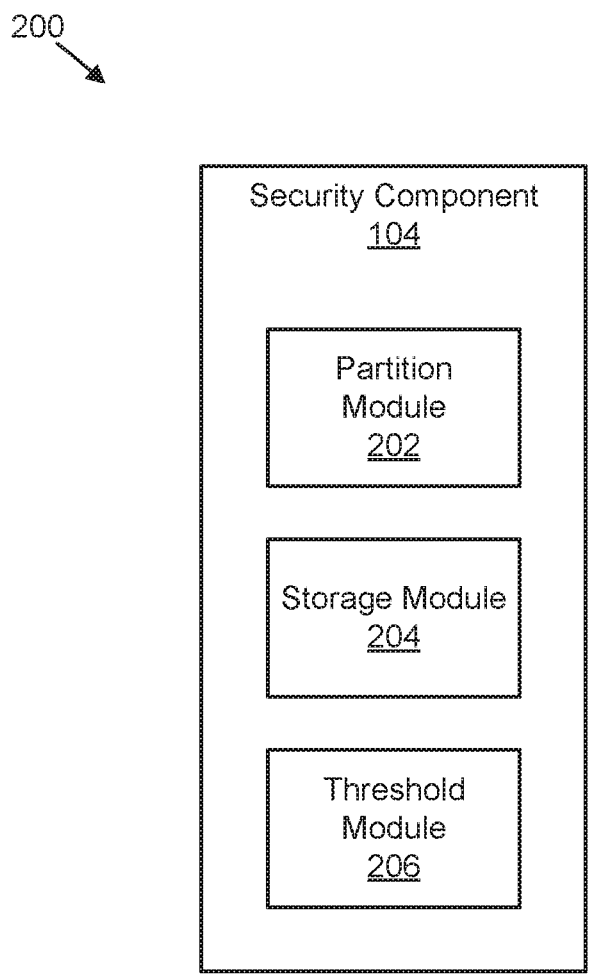
FIG. 2 depicts a schematic block diagram of one embodiment of an apparatus for securing data based on randomization.

FIG. 2 depicts one embodiment of an apparatus 200 for securing data based on randomization. In one embodiment, the apparatus 200 includes an embodiment of a security component 104. The security component 104, in certain embodiments, includes one or more of a partition module 202, a storage module 204, and a threshold module 206, which are described in more detail below.

The partition module 202, in one embodiment, is configured to partition a data element into a plurality of data segments. In one embodiment, the data element comprises a file, a plurality of files, an image, text, a document, a video, a data buffer, a series of bits or bytes, encryption keys, credit card numbers, account numbers, user credentials, biometric information, and/or any other type of data that can be stored on a memory device.

In certain embodiments, the partition module 202 is configured to randomly determine sizes for the data segments prior to partitioning the data element into the plurality of data segments. For instance, the partition module 202 may randomly determine sizes of the data segments on a per-data-segment basis such that a size for each data segment is randomly determined prior to partitioning each data segment. For example, the partition module 202 may randomly determine a size of a first data segment, and then randomly determine a size of a second data segment, and so on until the data element has been fully partitioned. In such an embodiment, the partition module 202 may partition the data element into a predetermined or randomly determined number of data segments, may determine data segment sizes for each data segment so that each data segment size is greater than or equal to a threshold size, and/or the like.

In some embodiments, the partition module 202 randomly determines sizes of the data segments on a per-data-element basis such that a size for each data segment is randomly determined once such that the size of each data segment is substantially the same. For example, the partition module 202 may equally partition a data buffer comprising twenty bytes into four data segments that each have a size of five-bytes. In such an embodiment, the partition module 202 may determine the total size of the data element and randomly determine a segment size such that the data segments each have the same size. In some circumstances, if the data element is not evenly divisible, then the partition module 202 may determine a size of the data segments such that the data segments each have substantially the same size. For example, if the data element comprises 21 bytes, the partition module 202 may divide the data element into four data segments, three of which are five bytes long with the fourth data segment being six bytes long.

The storage module 204, in one embodiment, is configured to determine a first set of storage locations for the plurality of data segments such that the data segments are not stored in contiguous storage locations. In certain embodiments, the storage locations may include volatile memory locations (e.g., RAM, cache, registers, or the like), non-volatile memory locations (e.g., hard disk drives, flash memory, or the like), files, data buffers, shared memory, and/or other data structures and memory devices. In various embodiments, the storage locations are not contiguous such that the data segments are not stored in a predictable order. For instance, the data segments may be stored in different files, different memory blocks, different sectors, different die, different chips, different devices (e.g., in a distributed system) or the like instead of adjacent or contiguous memory addresses or locations.

In one embodiment, the storage module 204 randomly determines the first set of storage locations. For instance, the storage module 204 may generate random numbers, identifiers, strings, indexes, addresses, and/or the like that correspond to, map to, or otherwise reference memory or storage locations where the data segments can be stored. In further embodiments, the storage module 204 uses a reproducible pseudorandom seeded algorithm to generate identifiers that correspond to the first set of storage locations. For example, the storage module 204 may determine a set of available storage locations (e.g., memory addresses) and assign, map to, or otherwise associate a possible identifier or value that the reproducible pseudorandom seeded algorithm may generate with the determined set of available storage locations.

As used herein, a reproducible pseudorandom seeded algorithm may comprise a function, program, library, object, or the like that is configured to generate a random value based on a seed value provided to the reproducible pseudorandom seeded algorithm. The algorithm is reproducible and pseudorandom because the same random value will be generated for the same seed value. In other words, for a given seed value, the reproducible pseudorandom seeded algorithm will produce the same "random" value. In this manner, the storage module 204 can identify the randomly determined first set of storage locations by providing the same seed values to the reproducible pseudorandom seeded algorithm that were used to generate the random identifiers for the first set of storage locations.

In one embodiment, the storage module 204 randomly generates and stores the seed values that are used to generate the identifiers for the first set of storage locations. In certain embodiments, the storage module 204 may use a truly random function or algorithm to generate one or more seed values that are used to seed the reproducible pseudorandom seeded algorithm and randomly determine the storage locations for the data segments. For instance, the storage module 204 may seed a random number generator with a constantly changing value, such as the current time, to generate truly random seed values. In some embodiments, the number of seed values that are generated is equivalent to the number of storage locations that are needed to store the data segments.

In one embodiment, the storage module 204 stores the generated seed values in a data structure, e.g., an array, list, stack, queue, file, database, or the like, so that the seed values can be used to seed the reproducible pseudorandom seeded algorithm to determine the storage locations of the data segments. For example, if a data request is received for the data element, the storage module 204 may check the data structure that stores the generated seed values to read the seed values and input the seed values into the reproducible pseudorandom seeded algorithm to determine the identifiers for the storage locations where the data segments that comprise the data element are stored.

In one embodiment, the storage module 204 tracks, maintains, stores, or the like the order in which the data segments are partitioned so that the same order can be used to reconstitute the data element. For instance, the storage module 204 may map a data segment when it is partitioned from the data element to an order value (e.g., 1, 2, 3, and so on) so that the order of the data segments can be determined to reconstitute the data element when the data element is accessed, e.g., in response to a read request. The map may be stored in a file, database, or other data structure, which may be stored in a separate location from the storage location of the data structure used to store the seed values.

In one embodiment, the threshold module 206 is configured to randomly determine an access threshold for the data element. As used herein, the access threshold comprises the number of times the data element can be accessed before determining different storage locations for the plurality of data segments. For instance, after the data element is accessed the access threshold number of times, the storage module 204 randomly determines a new set of storage locations for the plurality of data segments. In such an embodiment, the threshold module 206 randomly determines a new access threshold that is used to determine the next time the storage module 204 randomly determines new storage locations for the plurality of data segments.

The threshold module 206, in certain embodiments, uses a random number generator to determine the access threshold value. For instance, the threshold module 206 may seed a random number generator with a constantly changing value, such as the current time, to generate a truly random value for the access threshold. In some embodiments, the threshold module 206 sets a predetermined limit, predefined range, or the like for the access threshold such that the random value does not exceed the predetermined limit. For instance, the threshold module 206 may ensure that the generated random value is a value between 1 and 20 so that possible random values for access threshold is selected within the range of 1 to 20.

In this manner, the storage locations for the data segments may constantly change on a random basis, and the intervals in which the storage locations are changed (as defined based on the access threshold value) may also be randomly determined so that a hacker or other unauthorized user cannot determine or identify a storage pattern for the storage of the data element, which may comprise sensitive data such as personal identification data, user credentials, financial data, encryption keys, and/or the like.

In such an embodiment, when the storage module 204 randomly determines the new set of storage locations for the data segments, the storage module 204 ensures that the new set of storage locations does not comprise a storage location that was used in the first set of storage locations. For example, if the storage module 204 randomly generates an identifier that corresponds to a storage location that is currently being used, has previously been used, has previously been used a threshold number of times, or the like, to store a data segment, the storage module 204 may randomly generate another identifier until a storage location is determined that is not currently being used, that has never been used, or that has not previously been used the threshold number of times.

In further embodiments, the storage module 204 is further configured to delete the plurality of data segments from the first set of storage locations in response to the storage module 204 storing the plurality of data segments at the new set of storage locations. In such an embodiment, the storage module 204 maintains accessibility to the plurality of data segments stored at the first set of storage locations until the plurality of data segments are stored and accessible at the new set of storage locations. Furthermore, in one embodiment, the storage module 204 regenerates the random seed values for the reproducible pseudorandom seeded algorithm prior to using the reproducible pseudorandom seeded algorithm to determine the new set of storage locations for the data segments.

In one embodiment, the partition size, the seed values for the random number generators, the storage locations, the access threshold value, and/or other randomly determined values are determined at compile time, at build time, during assembly, at runtime, and/or the like of the security component 104 without user input. In this manner, even a developer, programmer, engineer, administrator, and/or the like cannot know, program, configure, set, or otherwise determine the random values for the partition sizes, seed values, storage locations, and access thresholds that the security component 104 determines. Furthermore, this allows the security component 104 to provide secure data storage based on randomizing various parameters, settings, or the like that are unknown to a hacker, developer, or other user.

Figure 3:
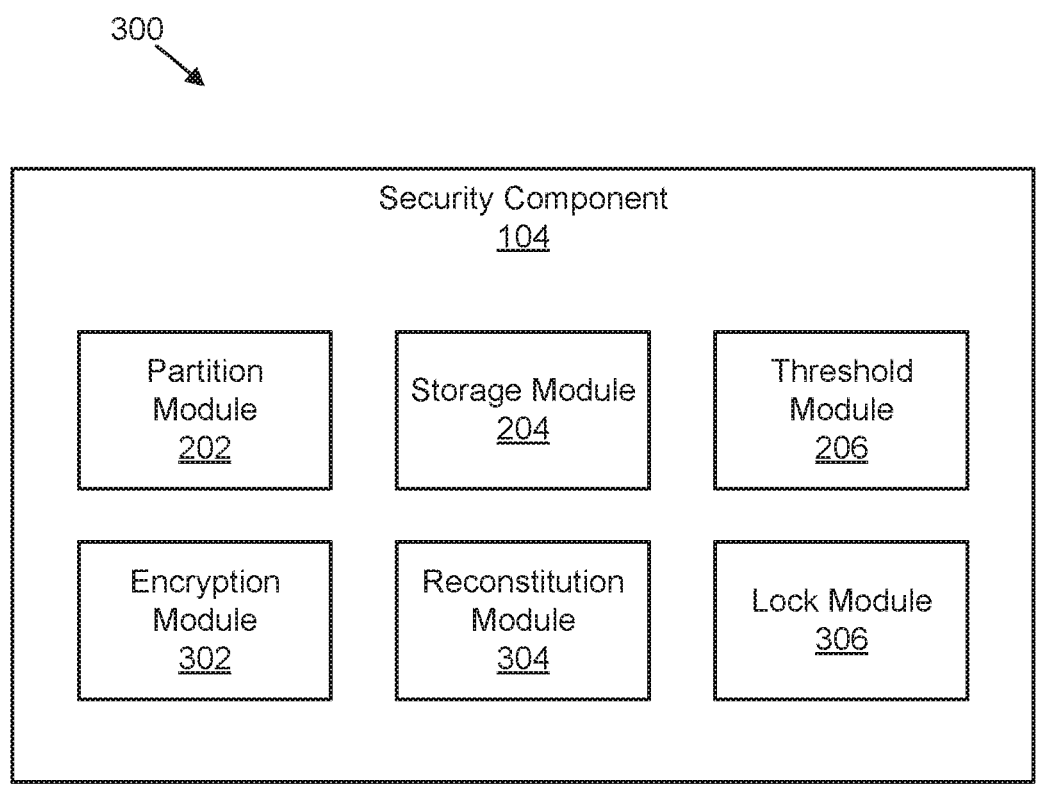
FIG. 3 depicts a schematic block diagram of one embodiment of another apparatus for securing data based on randomization.

FIG. 3 depicts one embodiment of an apparatus 300 for securing data based on randomization. In one embodiment, the apparatus 300 includes an embodiment of a security component 104. The security component 104, in certain embodiments, includes one or more of a partition module 202, a storage module 204 and a threshold module 206, which may be substantially similar to the partition module 202, the storage module 204, and the threshold module 206 described above with reference to FIG. 2. Furthermore, the security component may include one or more of an encryption module 302, a reconstitution module 304, and a lock module 306, which are described in more detail below.

In one embodiment, the encryption module 302 is configured to encrypt the plurality of data segments using an encryption algorithm. The encryption algorithm may include various encryption protocols such as advanced encryption standard (AES), ZeroMQ, or the like. In certain embodiments, the encryption module 302 randomly selects, determines, identifies, or the like the encryption algorithm. For instance, the encryption module 302 may generate a random value that corresponds or maps to a particular encryption algorithm. For example, the encryption module 302 may maintain a list, data structure, or the like of available encryption algorithms that can be called, invoked, or otherwise used to encrypt the data segments such that each encryption algorithm maps to a value, or range of values, that the encryption module 302 randomly generates.

In one embodiment, the encryption module 302 randomly selects an encryption algorithm for the plurality of segments such that each data segment is encrypted with the same encryption protocol. In some embodiments, the encryption module 302 randomly selects an encryption algorithm on a per-data-segment basis such that a different encryption algorithm may be randomly selected for each data segment. In such an embodiment, the encryption module 302 may ensure that the same encryption algorithm is not used twice, is not used on consecutive data segments, and/or the like.

As with the other random values discussed above, the available encryption protocols and the random selection of encryption protocols for encrypting the data segments may be determined at compile time, at build time, during assembly, at runtime, and/or the like of the security component 104 without user input from developers, programmers, engineers, administrators, and/or other users. In certain embodiments, the encryption module 302 decrypts the encrypted data segments using the randomly determined encryption algorithm when the data element is accessed.

In one embodiment, the reconstitution module 304 is configured to reconstitute the data element in response to a request for the data element. For instance, in response to an application, user, program, function, or the like accessing the data element, e.g., issuing a read request command for the data element, the reconstitution module 304 determines the first set of storage locations for the plurality of data segments by inputting the previously determined and stored seed values into the reproducible pseudorandom seeded algorithm, determining the previously determined and stored order of the data segments, and combining the data segments into the data element based on the determined order. In this manner, the reconstitution module 304 may provide the data element to applications, programs, functions, or the like that request access to it, without revealing the storage locations of the data segments that constitute the data element.

It should be noted that when the data element is accessed, and the reconstitution module 304 reconstitutes the data element to make it accessible, the reconstitution module 304 or the threshold module 206 may increment an access counter, variable, parameter, setting, or the like that tracks how many times the data element has been accessed to determine whether the number of accesses satisfies the current access threshold. If the number of accesses satisfies the current access threshold, and it is determined that the storage module 204 needs to determine a new set of storage locations for the plurality of data segments, the reconstitution module 304 may reconstitute the data element, as described above, and then the partition module 202 may randomly re-partition the data element into data segments, the storage module 204 may randomly determine the new set of storage locations for the data segments, and the threshold module 206 may randomly determine a new access threshold while resetting the access counter.

In one embodiment, the lock module 306 is configured to prevent read and write accesses to the set of storage locations where the plurality of data segments is stored from processes, programs, functions, applications, and/or the like other than the process that was used to generate and store the plurality of data segments at the set of storage locations. For instance, the lock module 306 may detect or determine when a data segment is part of a page or block in memory, and may block read and write access to the data segment from processes that did not load the page or block in memory using various page or memory locks (such as semaphores or mutexes) such that the process that loaded the page or block in memory, e.g., the originating or parent process, is the only process that has read and write access to the data segment. The lock module 306 may issue, trigger, send, or the like a segmentation fault, an alert, and/or other notification to indicate that a different process attempted to read the storage location for the data segment or write to the storage location of the data segment. In this manner, any reads or writes to the memory blocks that comprise the plurality of data segments may need to go through the originating process.

Figure 4:
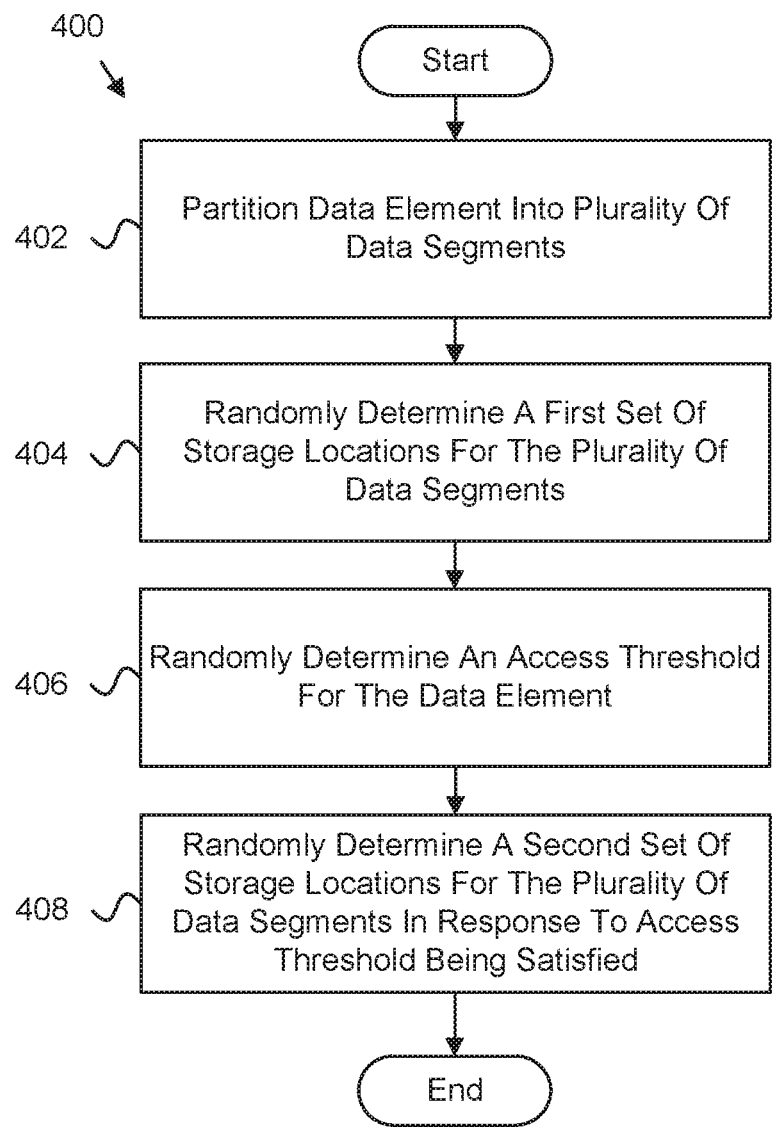
FIG. 4 depicts a schematic flow-chart diagram of one embodiment of a method for securing data based on randomization.

FIG. 4 depicts a flow-chart diagram illustrating one embodiment of a method 400 for securing data based on randomization. In one embodiment, the method 400 begins and the partition module 202 partitions 402 a data element into a plurality of data segments. In further embodiments, the storage module 204 randomly determines 404 a first set of storage locations for the plurality of data segments such that the data segments are not stored in contiguous storage locations.

In some embodiments, the threshold module 206 randomly determines 406 an access threshold for the data element. In certain embodiments, the access threshold comprises a number of times the data element can be accessed before determining different storage locations for the plurality of data segments. In further embodiments, the plurality of data segments can be reconstituted in response to a data access, e.g., in response to a read request for the data element. In one embodiment, the storage module 204 randomly determines 408 a second set of storage locations for the plurality of data segments in response to the access threshold being satisfied, and the method 400 ends.

Figure 5:
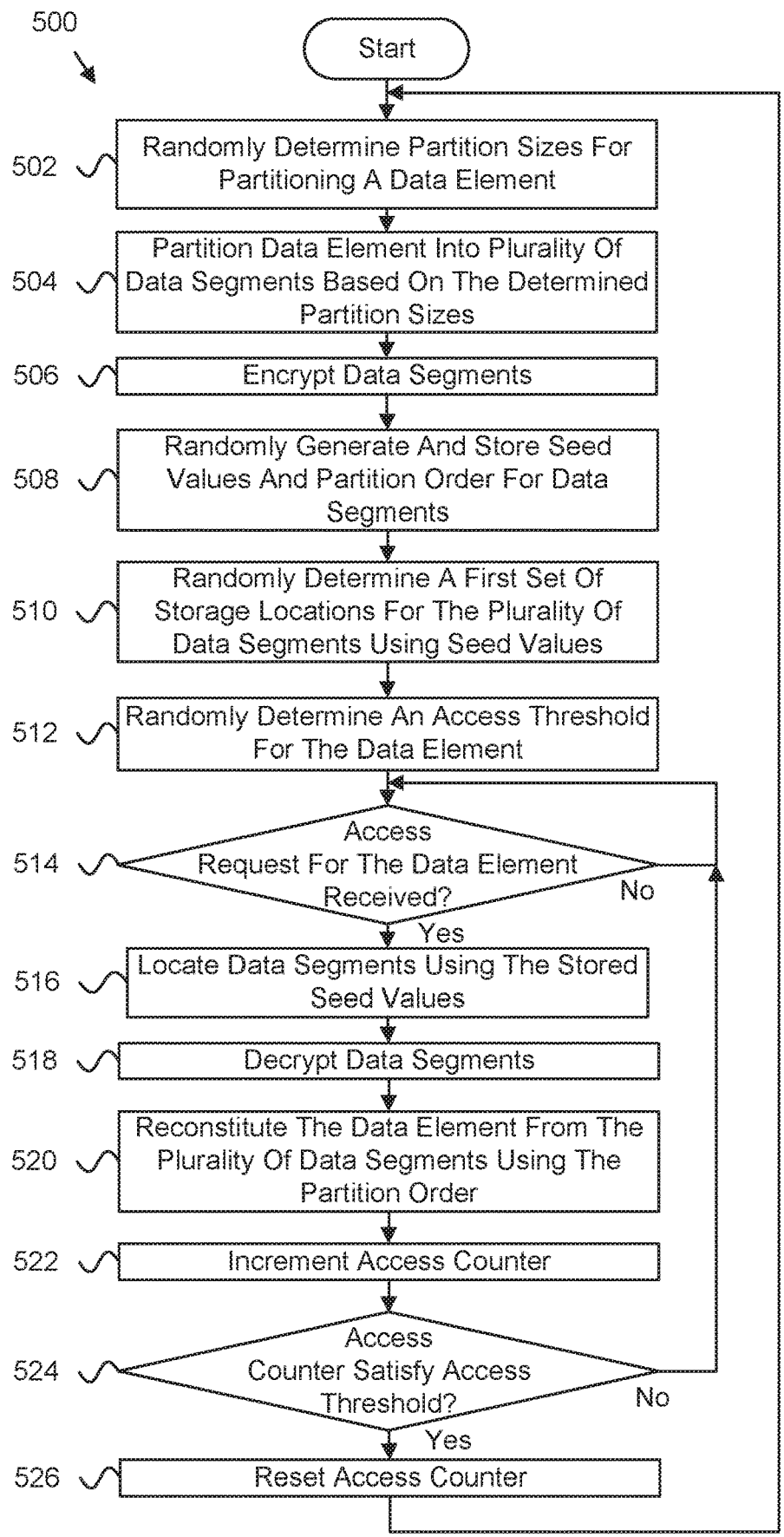
FIG. 5 depicts a schematic flow-chart diagram of one embodiment of another method for securing data based on randomization.

FIG. 5 depicts a flow-chart diagram illustrating one embodiment of a method 500 for securing data based on randomization. In one embodiment, the method 500 begins and the partition module 202 randomly determines 502 sizes of the data segments prior to partitioning the data element into the plurality of data segments. In further embodiments, the partition module 202 partitions 504 the data element into a plurality of data segments.

In some embodiments, the encryption module 302 encrypts 506 the data segments. In various embodiments, the storage module 204 randomly generates 508 a plurality of seed values for a reproducible pseudorandom seeded algorithm and stores the seed values and the partition order for the data segments (for reassembling the data element). In one embodiment, the storage module 204 randomly determines 510 a first set of storage locations for the plurality of data segments such that the data segments are not stored in contiguous storage locations.

In one embodiment, the threshold module 206 randomly determines 512 an access threshold for the data element. In certain embodiments, the access threshold comprises a number of times the data element can be accessed before determining different storage locations for the plurality of data segments. In various embodiments, the storage module 204 determines 514 whether an access request for the data element is received. If not, the storage module 206 may continue to determine 514 whether an access request for the data element is received.

Otherwise, the storage module 204 locates 516 the data segments stored at the first set of storage locations by inputting the stored seed values into the reproducible pseudorandom seeded algorithm to generate the identifiers for the first set of storage locations. In further embodiments, the encryption module 302 decrypts 518 the data segments, and the reconstitution module 304 reconstitutes 520 or reassembles the data element using the plurality of data segments and the previously stored partition order for the data segments.

In one embodiment, the threshold module 206 increments 522 an access counter and determines 524 whether the access counter value satisfies the randomly determined access threshold. If not, the storage module 206 may continue to determine 514 whether an access request for the data element is received. Otherwise, the threshold module 206 resets 526 the access counter, and the method 500 begins again with the partition module 202 randomly determining 502 sizes of the data segments, partitioning 504 the data element into a plurality of data segments, and so on.

A means for partitioning a data element into a plurality of data segments, in various embodiments, may include a partition module 202, a security component 104, a processor, an FPGA, an ASIC, a computing device 110, other logic hardware, and/or other executable code stored on a computer readable storage medium. Other embodiments may include similar or equivalent means for partitioning a data element into a plurality of data segments.

A means for randomly determining a first set of storage locations for the plurality of data segments, in various embodiments, may include a storage module 204, a security component 104, a processor, an FPGA, an ASIC, a computing device 110, other logic hardware, and/or other executable code stored on a computer readable storage medium. Other embodiments may include similar or equivalent means for randomly determining a first set of storage locations for the plurality of data segments.

A means for randomly determining an access threshold for the data element, in various embodiments, may include a threshold module 206, a security component 104, a processor, an FPGA, an ASIC, a computing device 110, other logic hardware, and/or other executable code stored on a computer readable storage medium. Other embodiments may include similar or equivalent means for randomly determining an access threshold for the data element.

A means for randomly determining a second set of storage locations for the plurality of data segments in response to the access threshold being satisfied, in various embodiments, may include a storage module 204, a security component 104, a processor, an FPGA, an ASIC, a computing device 110, other logic hardware, and/or other executable code stored on a computer readable storage medium. Other embodiments may include similar or equivalent means for randomly determining a second set of storage locations for the plurality of data segments in response to the access threshold being satisfied.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a partition module configured to partition a data element into a plurality of data segments;
   a storage module configured to randomly determine a first set of storage locations for the plurality of data segments such that the plurality of data segments are not stored in contiguous storage locations; and
   a threshold module configured to:
      randomly determine an access threshold for the data element, the access threshold setting an interval for a number of times the data element can be accessed before determining different storage locations for the plurality of data segments, the plurality of data segments being reconstituted in response to a data access;
      increment an access counter in response to the data element being accessed; and
      determine whether the access counter satisfies the access threshold,
   wherein the storage module randomly determines a second set of storage locations for the plurality of data segments in response to the access threshold being satisfied.

2. The apparatus of claim 1, wherein the partition module is further configured to randomly determine sizes of the plurality of data segments prior to partitioning the data element into the plurality of data segments.

3. The apparatus of claim 2, wherein the partition module is further configured to randomly determine sizes of the plurality of data segments on one of a:
   per-data-segment basis such that a size for each data segment is randomly determined prior to partitioning each data segment; and
   per-data-element basis such that a size for each data segment is randomly determined once such that the size of each data segment is substantially similar.

4. The apparatus of claim 1, further comprising an encryption module configured to encrypt the plurality of data segments using an encryption algorithm, the encryption algorithm randomly selected from a plurality of encryption algorithms configured to encrypt the plurality of data segments.

5. The apparatus of claim 1, wherein the storage module is further configured to randomly determine the first set of storage locations based on a reproducible pseudorandom seeded algorithm, the reproducible pseudorandom seeded algorithm generating identifiers for the first set of storage locations based on seed values such that the first set of storage locations can be identified by inputting the same seed values into the reproducible pseudorandom seeded algorithm.

6. The apparatus of claim 5, wherein the storage module is further configured to randomly generate and store the seed values for the first set of storage locations so that the generated seed values can be used to access the plurality of data segments from the first set of storage locations.

7. The apparatus of claim 5, wherein the storage module is further configured to regenerate random seed values prior to determining the second set of storage locations using the reproducible pseudorandom seeded algorithm.

8. The apparatus of claim 5, wherein the storage module is further configured to maintain an order of the plurality of data segments such that the plurality of data segments can be combined in a correct order when the data element is reconstituted.

9. The apparatus of claim 8, further comprising a reconstitution module configured to:
   receive a request for the data element;
   determine the first set of storage locations for the plurality of data segments of the data element by inputting the stored seed values into the reproducible pseudorandom seeded algorithm;
   determine the order of the plurality of data segments; and
   combine the plurality of data segments, in the determined order, into the data element.

10. The apparatus of claim 1, wherein the storage module is further configured to delete the plurality of data segments from the first set of storage locations in response to the plurality of data segments being stored at the second set of storage locations, the plurality of data segments stored at the first set of storage locations being accessible until the plurality of data segments are stored at the second set of storage locations.

11. The apparatus of claim 1, wherein the first set of storage locations and the access threshold are randomly determined without user input during one or more of compile time and runtime.

12. The apparatus of claim 1, further comprising a lock module configured to prevent read and write accesses to the first set of storage locations from processes other than a process that was used to store the plurality of data segments at the first set of storage locations.

13. A method, comprising:
   partitioning a data element into a plurality of data segments;
   randomly determining a first set of storage locations for the plurality of data segments such that the plurality of data segments are not stored in contiguous storage locations;

randomly determining an access threshold for the data element, the access threshold setting an interval for a number of times the data element can be accessed before determining different storage locations for the plurality of data segments, the plurality of data segments being reconstituted in response to a data access;

incrementing an access counter in response to the data element being accessed;

determining whether the access counter satisfies the access threshold; and randomly determining a second set of storage locations for the plurality of data segments in response to the access threshold being satisfied.

14. The method of claim 13, further comprising randomly determining sizes of the plurality of data segments prior to partitioning the data element into the plurality of data segments on one of a:

per-data-segment basis such that a size for each data segment is randomly determined prior to partitioning each data segment; and per-data-element basis such that a size for each data segment is randomly determined once such that the size of each data segment is substantially similar.

15. The method of claim 13, further comprising randomly determining the first set of storage locations based on a reproducible pseudorandom seeded algorithm, the reproducible pseudorandom seeded algorithm generating identifiers for the first set of storage locations based on seed values such that the first set of storage locations can be identified by inputting the same seed values into the reproducible pseudorandom seeded algorithm.

16. The method of claim 15, further comprising randomly generating and storing the seed values for the first set of storage locations so that the generated seed values can be used to access the plurality of data segments from the first set of storage locations.

17. The method of claim 15, further comprising regenerating random seed values prior to determining the second set of storage locations using the reproducible pseudorandom seeded algorithm.

18. The method of claim 15, further comprising maintaining an order of the plurality of data segments such that the plurality of data segments can be combined in a correct order when the data element is reconstituted.

19. The method of claim 18, further comprising:

receiving a request for the data element;

determining the first set of storage locations for the plurality of data segments of the data element by inputting the stored seed values into the reproducible pseudorandom seeded algorithm;

determining the order of the plurality of data segments; and combining the plurality of data segments, in the determined order, into the data element.

20. An apparatus, comprising:

means for partitioning a data element into a plurality of data segments;

means for randomly determining a first set of storage locations for the plurality of data segments such that the plurality of data segments are not stored in contiguous storage locations;

means for randomly determining an access threshold for the data element, the access threshold setting an interval for a number of times the data element can be accessed before determining different storage locations for the plurality of data segments, the plurality of data segments being reconstituted in response to a data access;

means for incrementing an access counter in response to the data element being accessed;

means for determining whether the access counter satisfies the access threshold; and means for randomly determining a second set of storage locations for the plurality of data segments in response to the access threshold being satisfied.

* * * * *